Figure 1:
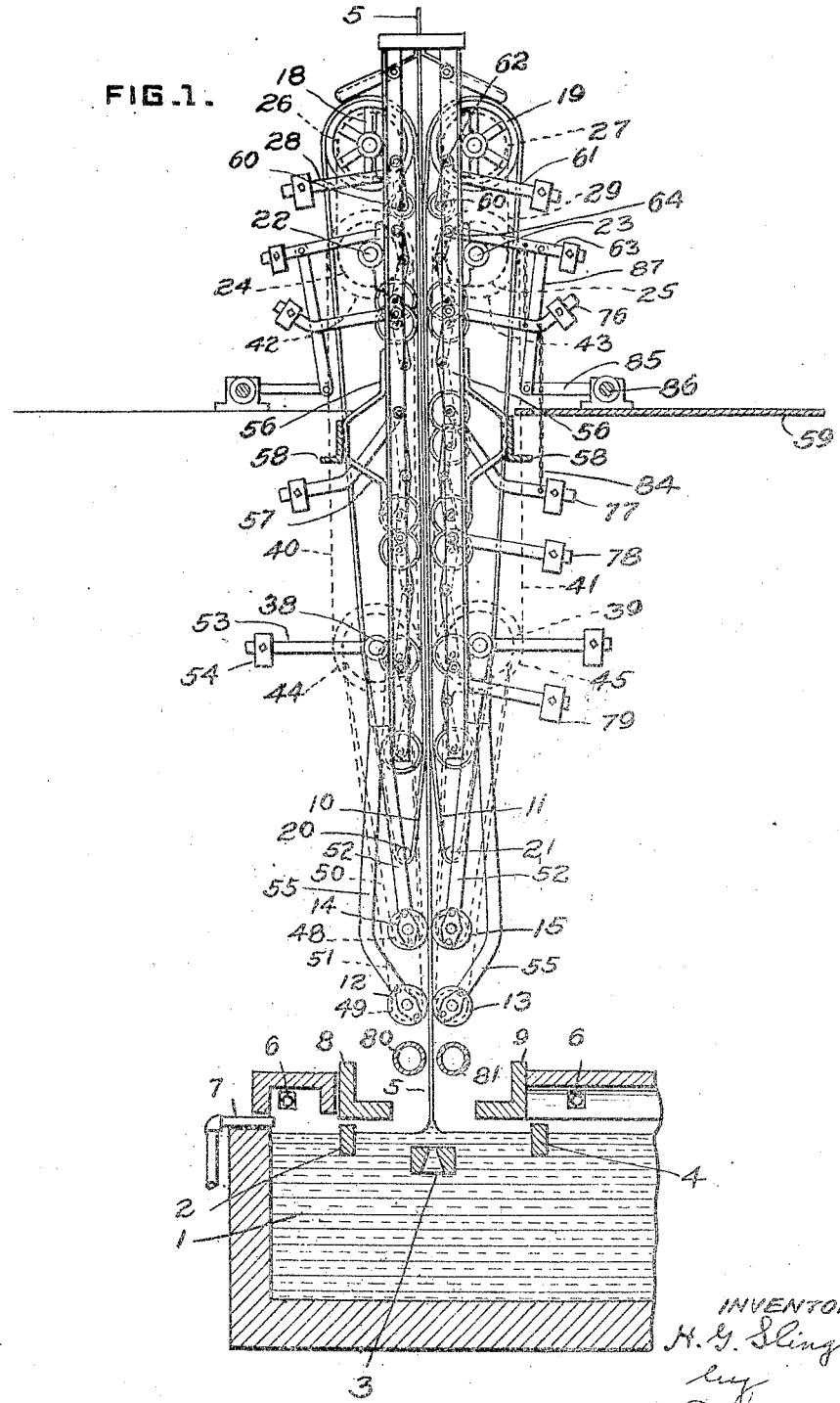

Sept. 7, 1926.

H. G. SLINGLUFF

APPARATUS FOR DRAWING SHEET GLASS

Filed Feb. 26, 1923     3 Sheets-Sheet 1

INVENTOR
H. G. Slingluff
by
James C. Bradley
Atty

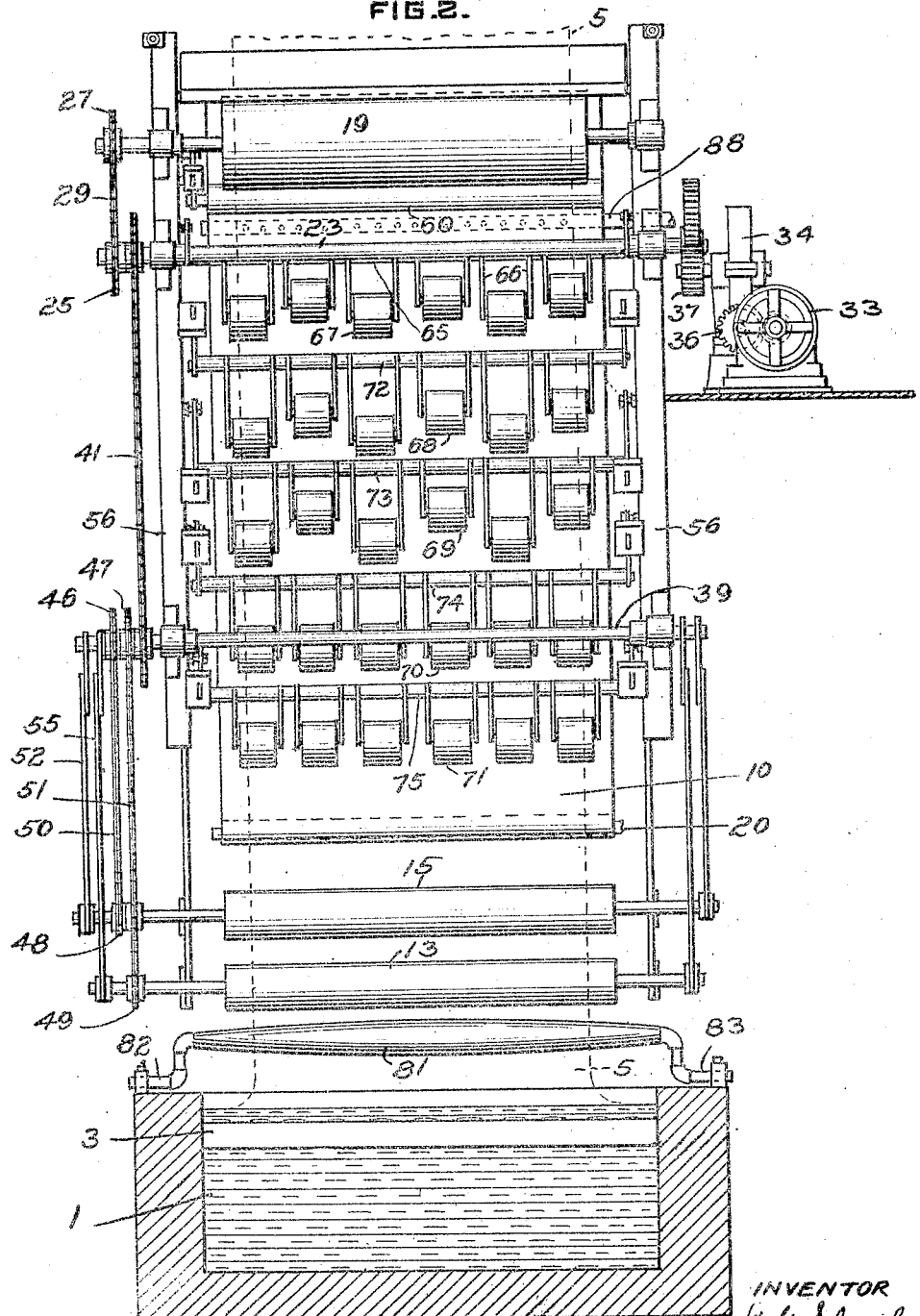

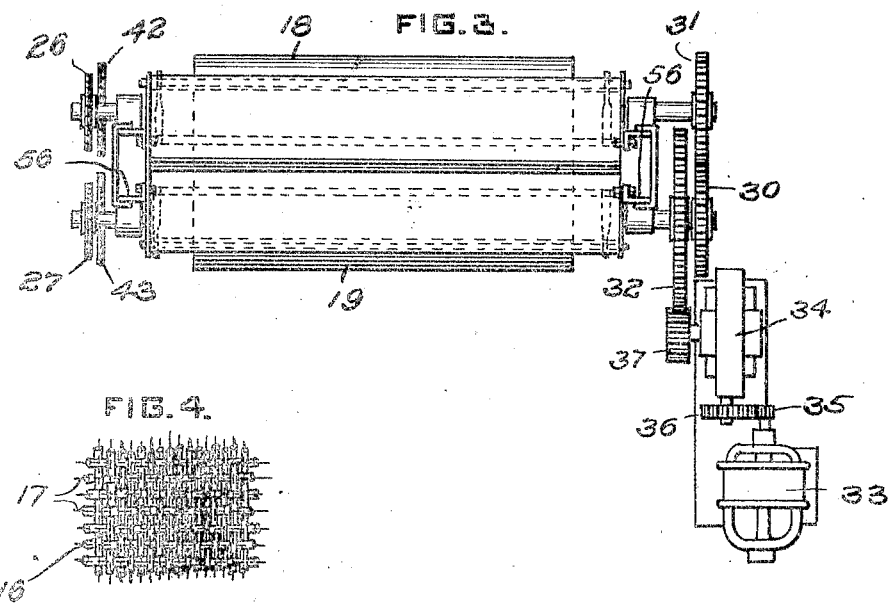
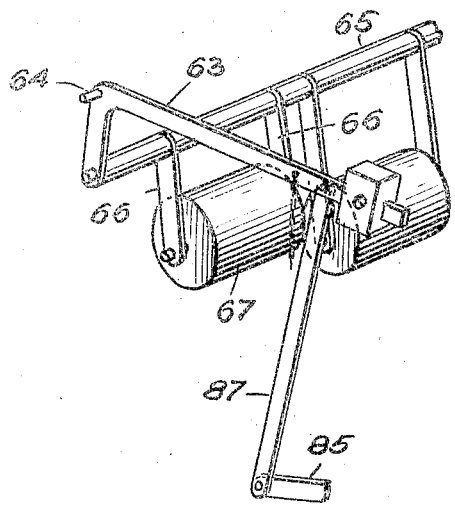

Patented Sept. 7, 1926.

1,598,751

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

APPARATUS FOR DRAWING SHEET GLASS.

Application filed February 26, 1923. Serial No. 621,184.

The invention relates to apparatus for drawing glass in a continuous sheet. It has for its primary objects the provision of an improved apparatus, (1) which will draw the glass sheet continuously without imposing any substantial strain thereon tending to break it, (2) which can be installed in a limited amount of overhead space, (3) which shall be of relatively cheap simple construction with a low cost of upkeep, (4) which keeps the glass sheet relatively flat and straight, and (5) which provides for a reduction in temperature of the glass sheet during the drawing operation such that breakage is avoided, and the glass is so annealed and reduced in temperature that it may be cut off and handled without difficulty as it emerges from the upper end of the apparatus. One embodiment of the invention is shown in the accompanying drawings wherein:

Figure 1 is an end elevation of the apparatus. Fig. 2 is a front elevation with the curtain or belt on the near side removed in order to show certain of the parts which would otherwise be covered. Fig. 3 is a plan view. Fig. 4 is a detail view of a small section of one of the curtains or belts showing the reinforced construction of the fabric and Fig. 5 is a perspective detail view.

The drawing apparatus to which the present invention relates is shown as located above the tank construction preferably employed, but is not limited to use with such form of tank. The tank includes a melting tank or furnace of the regenerative type which is not shown and a drawing tank 1 containing a bath of molten glass and the clay members 2, 3 and 4 lying in such bath, 2 and 4 being skimming bars and 3 a guide bar located beneath the line of generation of the sheet 5. The tank is provided with suitable burners 6 and 7 and with L shaped shielding members 8 and 9 lying above the bath on opposite sides of the sheet.

The main drawing force for the sheet is applied by means of the endless belts or curtains 10 and 11 made of asbestos fabric and the sets of driven rolls 12 and 13 and 14 and 15. The belts 10 and 11 are made of woven asbestos fabric, diagrammatically shown in Fig. 4, such fabric having its strands 16 reinforced by the fine metal wires 17, each of which is embedded in the asbestos. This wire reinforcing gives the necessary strength to the fabric, while the asbestos protects the wires from the action of the heat and provides a relatively soft flexible refractory surface for contacting with the glass. The drawing rolls 12 and 13 and 14 and 15 are also covered with a similar fabric of which there may be several layers, thus giving a yielding contact with the glass sheet and avoiding any scratching or marring which might otherwise be present with rolls having metal contacting surfaces.

The belts 10 and 11 are driven from the pulleys 18 and 19 at the upper ends of the apparatus and tension is applied to the belts at their lower ends by means of the steel bars 20 and 21 placed in the lower ends thereof. These bars 20 and 21 are circular in cross section and are supported entirely by the belts. The pulleys 18 and 19 are preferably spaced apart as indicated in Fig. 1 so that no pressure is applied by such rolls to the glass sheet 5 which passes therebetween. In this way any tendency to break the glass is avoided which might otherwise occur if the glass as it passed these pulleys was not perfectly flat.

The pulleys 18 and 19 are driven from a pair of counter shafts 22 and 23 which counter shafts carry at the ends the sprockets 24 and 25 geared to corresponding sprockets 26 and 27 on the ends of the pulley shafts by means of the sprocket chains 28 and 29. The opposite ends of the counter shafts 22 and 23 are provided with intermeshing spur gears 30 and 31 (Fig. 3), the shaft 23 also being provided with a spur gear 32 which is driven from the electric motor 33 by means of the reducing gearing shown in Figs. 2 and 3. This reducing gearing includes a worm drive in the casing 34, spur gears 35 and 36 and the spur gear 37 on the shaft of the worm wheel.

Rollers 12 and 13 and 14 and 15 are driven from counter shafts 38 and 39 and such counter shafts are driven from the counter shafts 22 and 23 by means of sprocket chains 40 and 41 passing around sprocket wheels 42 and 43 on the shafts 22 and 23 and around sprockets 44 and 45 on the shafts 38 and 39. Each of the shafts 38 and 39 carries a pair of additional sprocket wheels 46 and 47 which drive the sprockets 48 and 49 on the shafts of the rollers 12, 13, 14 and 15, this being accomplished by means of suitable sprocket chains 50 and 51.

The upper drawing rolls 14 and 15 are carried upon bell crank hangers, the vertical legs 52 of which hangers carry the rolls at their lower ends, while the horizontal arms 53 of such hangers are provided with counter weights 54 so that the rolls 14 and 15 are pressed inwardly against the opposite sides of the glass sheet. The drawing rolls 12 and 13 are similarly supported and pressed inward by means of the bell crank levers 55. The horizontal arms of these levers are not shown in Fig. 1, as they lie behind the arms 53, but they are similarly arranged and provided with suitable counter weights. Both sets of bell crank hangers are pivotally supported upon the shafts 38 and 39.

In order to provide for the support of the apparatus, vertical framework is preferably employed consisting of the angle irons 55 suitably tied together and carried by the brackets 57 mounted upon the horizontal angles 58 which are secured to the superstructure of the building in which the apparatus is employed. The apparatus is ordinarily of such length that a floor 59 may be provided just above the angles 58, thus giving convenient access to the upper end of the drawing mechanism.

In order to cause the belts to engage the glass sheet with proper drawing force and distribute the strain over the area of the belts, a series of rolls are provided between the flights of each belt and so arranged as to yieldingly press against the surfaces of the belts, such rolls being arranged opposite each other so that the pressure of one is counterbalanced by another lying opposite and any tendency to break the glass through uneven pressure is avoided. A considerable part of this gripping pressure is applied from the idler rolls 60 located just below the belt driving rolls 18 and 19 and supported upon the counter weighted bell crank hangers 61, such hangers being pivoted at 62 to the framework angles 56. These rolls are preferably covered with asbestos and extend across the width of the drawing belts. Located beneath the rolls 60 are other bell crank hangers 63 pivoted at 64 (see Figs. 1 and 5) to the frame angles 56 and supporting the transverse bars 65. These bars 65 are provided with pairs of arms 66 between each of which is a relatively short roll 67 for engaging the back of the drawing belt. These rolls 67 which are carried from the bar 64 are so arranged, as indicated in Fig. 2, that they lie at different elevations so as to better distribute the pressure of the series of rolls over the belt and over the glass which opposes the belt. These rolls 67 exert relatively only a slight pressure upon the belts since they are hung freely upon the bars 65 and press upon the belt only by reason of the fact that the center of the bar 65 lies slightly closer to the center line between the two belts than does the center line of the rollers.

In addition to the set of rolls 67 there are four other sets 68, 69, 70 and 71 supported from the bars 72, 73, 74 and 75, as above described in connection with the rollers 67, such bars being carried upon the bell crank hangers 76, 77, 78 and 79. In this manner yielding pressure is applied to the backs of the belts at a large number of separate points so that the strain upon the glass and the drawing strain upon the belts is distributed. This also serves the purpose of keeping the belts well in contact with the glass so that the cooling of the glass will be more uniform than if the belts had an opportunity to move out of contact with the glass over considerable areas. The cooling of the glass is thus made more uniform and the tendency to breakage due to unevenness in cooling is reduced.

Immediately below the drawing rolls 12 and 13 are located a pair of water coolers 80 and 81 extending transversely of the apparatus and increasing in diameter from their ends to their centers. These members are cooled by a circulation of water from the inlet 82 to the outlet 83 and their use assists in increasing the speed of draw, since they exert a certain amount of chilling effect upon the glass bath and also upon the glass sheet, which is plastic for a short distance upward from the surface of the glass. This chilling effect may be regulated by moving the coolers toward and from the sheet and also toward and from the surface of the glass. The members are varied in diameter from their ends to the center in order to give a variable cooling effect upon the glass, the tendency of the center of the sheet normally being to run hotter than the edges and tending to draw thinner than the edges. The use of the water coolers tends to counteract this tendency and gives a sheet in which the thickness is more uniform so that it is less liable to break. The coolers also perform an important function in connection with the rolls 12 and 13. These rolls, as before stated, are covered with an asbestos fabric and this fabric rapidly deteriorates under intense heat. The rolls are necessarily placed close to the glass bath and subject to great heat. The use of the water cooled members beneath the rolls protects them from this heat and increases their life several times over. In a similar way, the sets of rolls 12 and 13 protect the rolls 14 and 15 and they in turn protect the belts 10 and 11. In this way, the use of the drawing devices beneath the belts involves a great saving in upkeep, as the life of the belts is increased. The cost of the belts, due to the quantity of material involved is very much greater than that of the drawing rolls beneath.

In case of breakage of the glass between the belts, it is often possible to continue the drawing operation because of the use of the rolls 12 and 13 and 14 and 15. The pressure exerted by these rolls is sufficient to continue the pulling of the glass even when the break extends to a point beneath the curtains. The rolls also steady the glass sheet and tend to maintain it in its proper position with respect to the bath. Due to inequalities in the temperature of the glass bath, there is a certain tendency at times for the sheet to move so that its line of generation is off center with respect to the center line of the guide bar 3, and in such case, the drawing rolls apply a constant pressure tending to correct this condition and bring the sheet to its proper position. They also protect the sheet from the heat of the bath beneath so that the glass enters the belts at a lower temperature than would otherwise be the case. As a result the sheet passes through and leaves the belts at a lower temperature than would otherwise be the case, rendering it easier to cut and handle. The temperature conditions are such that the glass is practically annealed before it enters the belts having a temperature ranging from 500° to 700° F. The conducting quality of the belts is such that the glass drops from this temperature to approximately 150° to 250° F. in its passage to the upper end of the apparatus, at which point it is cut off. This rate of cooling is slow enough to prevent any substantial breakage and yet sufficiently rapid to permit of proper handling and cutting of the glass upon its emergence from the curtains. This relatively rapid cooling is due to the fact that the belts are composed of a relatively thin woven texture with nothing to prevent the dispersion of heat from the rear faces of the belt flights in contact with the glass.

The dimensions of the apparatus and its location with respect to the bath will vary depending upon conditions, but in drawing at from 20 to 30 inches per minute, the lower ends of the belts may be located about 4 feet from the surface of the glass and that the belts are of such length that their upper ends are about 13 feet from the surface of the glass.

In order to permit the passage of a bait between the belts and the glass in starting the operation, the bell crank hangers 63, 76, 77, 78 and 79 may be connected by means of chains 84 so as to be operated in unison, and one of such hangers on each side of the machine may be connected with a crank arm 85 mounted on the shaft 86 by means of the bar 87. The shaft 86 is provided with a suitable rotating mechanism (not shown) so that by turning on this shaft the lever 85 may be moved upward, thus moving all of the counterweighted arms upward and swinging the rollers 67, 68, 69, 70 and 71 outward away from the curtain so that such curtain may move to the rear.

The cooling of the glass in its passage through the belts or curtains is promoted by the use of the air pipes 88, one of which is shown in Fig. 2. These pipes are placed just to the rear of the inner flights of the belts and have a series of perforations directed toward the curtain. Air is supplied from a fan or other suitable source, and serves to reduce the temperature of the curtains and the glass passing therebetween. The cooling renders the glass easier to handle and cut.

What I claim is:

1. In combination, apparatus for drawing glass in sheet form continuously from a bath of molten glass, comprising a pair of opposing vertical endless driven belts, means for causing the belts to grip the glass sheet being drawn therebetween, a pair of opposing rolls positioned intermediate the bath of glass and the lower ends of said belts, means for causing the rolls to press inward yieldingly against the surfaces of the glass sheet, and means for driving said rolls.

2. In combination, apparatus for drawing glass in sheet form continuously from a bath of molten glass, comprising a pair of opposing vertical endless driven belts, means for causing the belts to grip the glass sheet being drawn therebetween, a pair of opposing rolls positioned intermediate the bath of glass and the lower ends of said belts, and mounted for swinging movement toward and from the glass sheet and counterweights for causing the rolls to yieldingly press against the glass sheet in opposition to each other.

3. In combination, apparatus for drawing glass in sheet form continuously from a bath of molten glass, comprising a pair of opposing vertical endless driven belts, means for causing the belts to grip the glass sheet being drawn therebetween, a pair of opposing rolls positioned intermediate the bath of glass and the lower ends of said belts and mounted for swinging movement toward and from the glass sheet, counterweights for causing the rolls to yieldingly press against the glass sheet in opposition to each other and means for driving said rolls.

4. In combination, apparatus for drawing glass in sheet form continuously from a bath of molten glass, comprising a pair of opposing vertical endless driven belts, means for causing the belts to grip the glass sheet being drawn therebetween, a plurality of pairs of opposing drawing rolls positioned intermediate the bath of glass and the lower ends of said belts, means for causing the rolls to press inward yieldingly against the surfaces of the glass sheet, and means for driving the rolls.

5. In combination, apparatus for drawing glass in sheet form continuously from a bath of molten glass, comprising a pair of opposing endless belts, pulleys over which the belts pass at their upper ends, tension bars supported free to move vertically in the lower ends of the belts, and means intermediate said pulleys and said bars for applying yielding pressure to the rear faces of the inner flights of the belts to cause them to grip the glass sheet being drawn therebetween.

6. In combination, apparatus for drawing glass in sheet form continuously from a bath of molten glass, comprising a pair of opposing endless belts, pulleys over which the belts pass at their upper ends, tension weights in the form of circular bars lying in the lower ends of the belts, and means intermediate said pulleys and said bars for applying yielding pressure to the rear faces of the inner flights of the belts to cause them to grip the glass sheet being drawn therebetween.

7. In combination, apparatus for drawing glass in sheet form continuously from a bath of molten glass, comprising a pair of opposing endless belts, pulleys over which the belts pass at their upper ends, tension bars supported free to move vertically in the lower ends of the belts, and of less diameter than said pulleys and spaced apart so as to provide a V shaped entrance opening between the lower ends of the belts, and means intermediate said pulleys and said bars for applying yielding pressure to the rear faces of the inner flights of the belts to cause them to grip the glass sheet being drawn therebetween.

8. In combination, apparatus for drawing glass in sheet form continuously from a bath of molten glass, comprising a pair of opposing endless driven belts, means for causing the belts to grip the glass sheet being drawn therebetween, a pair of opposing driven rolls covered with asbestos fabric and positioned intermediate the bath of glass and the lower ends of said belts, means for causing the rolls to press inward against the surface of the glass sheet, and protecting water cooled conduits extending longitudinally below the rolls and adjacent thereto.

9. In combination, apparatus for drawing glass in sheet form continuously from a bath of molten glass comprising a pair of opposing endless belts of flexible asbestos fabric having metallic wire reinforcing woven therein, means for driving the belts, means for applying pressure to the belts to cause them to grip the glass, and means for applying air blasts to the rear faces of the flights of the belts in contact with the glass to cool the belts and the glass therebetween.

10. In glass drawing apparatus for drawing a sheet or ribbon continuously from a bath of molten glass, a pair of vertical opposing endless insulating curtains spaced above the bath adapted to receive the sheet and contact with it while the glass is dropping in temperature from that below the setting point to a point at which the glass may be cracked off, and opposing driven rollers between the curtains and the glass for applying drawing force to the sheet.

11. In glass drawing apparatus for drawing a sheet or ribbon continuously from a bath of molten glass, a pair of vertical opposing endless insulating curtains spaced above the bath adapted to receive the sheet and contact with it while the glass is dropping in temperature from that below the setting point to a point at which the glass may be cracked off and a plurality of pairs of opposing driven rollers between the curtains and the glass bath for applying drawing force to the sheet.

12. In combination in apparatus for drawing glass continuously from a molten bath, a pair of vertical opposing endless belts or curtains of insulating material above the surface of the glass bath, means for applying pressure to the rear sides of the flights of the belts to cause them to engage the glass, opposing driven rolls on opposite sides of the glass sheets below the belts and chilling means on opposite sides of the sheet below said driven rolls.

In testimony whereof, I have hereunto subscribed my name this 29th day of Jan'y, 1923.

HARRY G. SLINGLUFF.